US008854968B2

(12) United States Patent
Zhao et al.

(10) Patent No.: US 8,854,968 B2
(45) Date of Patent: Oct. 7, 2014

(54) COMMUNICATION NETWORK, DEVICE, AND METHOD

(75) Inventors: Yongxiang Zhao, Shenzhen (CN); Lian Yang, Shenzhen (CN); Wenyuan Yong, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 478 days.

(21) Appl. No.: 13/150,979

(22) Filed: Jun. 1, 2011

(65) Prior Publication Data

US 2011/0228676 A1   Sep. 22, 2011

Related U.S. Application Data

(63) Continuation of application No. PCT/CN2009/075267, filed on Dec. 2, 2009.

(30) Foreign Application Priority Data

Dec. 2, 2008  (CN) .......................... 2008 1 0218039

(51) Int. Cl.
| | | |
|---|---|---|
| G06F 11/00 | (2006.01) | |
| H04J 1/16 | (2006.01) | |
| H04L 1/00 | (2006.01) | |
| H04L 12/26 | (2006.01) | |
| H04W 28/08 | (2009.01) | |
| H04W 76/02 | (2009.01) | |
| H04W 28/06 | (2009.01) | |
| H04W 8/24 | (2009.01) | |

(52) U.S. Cl.
CPC ............. *H04W 28/08* (2013.01); *H04W 76/02* (2013.01); *H04W 28/06* (2013.01); *H04W 8/24* (2013.01)
USPC ....................................... 370/235; 370/235.1

(58) Field of Classification Search
CPC ..................................................... H04W 28/08
USPC ................. 370/328, 329, 325, 315, 229, 230, 370/230.1, 231, 232–235, 235.1, 236
See application file for complete search history.

(56) References Cited

U.S. PATENT DOCUMENTS 8,341,262 B2 * 12/2012 Pirzada et al. ................ 709/224
8,693,367 B2 *  4/2014 Chowdhury et al. ......... 370/253
(Continued)

FOREIGN PATENT DOCUMENTS

CN     101197817       6/2008
CN     101197817 A     6/2008
(Continued)

OTHER PUBLICATIONS

Written Opinion of the International Searching Authority mailed Mar. 11, 2010 in corresponding International Patent Application PCT/CN2009/075267.

(Continued)

*Primary Examiner* — Chuong T Ho
(74) *Attorney, Agent, or Firm* — Staas & Halsey LLP

(57) ABSTRACT

The present invention discloses a communication network, device and method. The communication method includes the following steps: a Mobile Broadband Edge (MBB-Edge) node sends a traffic offloading indication to a NodeB according to a traffic offloading policy; and the NodeB directs User Plane (UP) data of a Packet Switched (PS) service to a Public Data Network (PDN) through a fixed broadband bearer network of an offloading path according to the traffic offloading indication. The present invention increases the transmission efficiency of PS services.

15 Claims, 15 Drawing Sheets

(56) References Cited

U.S. PATENT DOCUMENTS

| | | | |
|---|---|---|---|
| 2003/0046330 A1* | 3/2003 | Hayes | 709/201 |
| 2003/0158906 A1* | 8/2003 | Hayes | 709/211 |
| 2007/0297334 A1* | 12/2007 | Pong | 370/235 |
| 2008/0261563 A1 | 10/2008 | Drevon et al. | |
| 2010/0121947 A1* | 5/2010 | Pirzada et al. | 709/224 |
| 2010/0202343 A1* | 8/2010 | Hunzinger et al. | 370/315 |
| 2011/0058479 A1* | 3/2011 | Chowdhury | 370/237 |
| 2011/0075557 A1* | 3/2011 | Chowdhury et al. | 370/230 |
| 2011/0075675 A1* | 3/2011 | Koodli et al. | 370/401 |

FOREIGN PATENT DOCUMENTS

| | | |
|---|---|---|
| CN | 101291464 | 10/2008 |
| CN | 101291464 A | 10/2008 |
| WO | 2008/077423 | 7/2008 |
| WO | 2008/077423 A1 | 7/2008 |
| WO | 2008/125729 | 10/2008 |

OTHER PUBLICATIONS

First Chinese Office Action mailed Apr. 20, 2012 issued in corresponding Chinese Patent Application No. 200810218039.5.

3GPP TR R3.020 V0.9.0, "$3^{rd}$ Generation Partnership Project; Technical Specification Group Radio Access Network; Home (e)NodeB; Network aspects (Release 8)", Technical Report, Sep. 2008, pp. 1-66.

$3^{rd}$ *Generation Partnership Project; Technical Specification Group Radio Access Network*; Home (e)NodeB; Network aspects (Release 8), 3GPP TR R3.020 V0.9.1, Nov. 2008, pp. 1-68.

Written Opinion of the International Searching Authority, mailed Mar. 11, 2010, in corresponding International Application No. PCT/CN2009/075267 (3 pp.).

Extended European Search Report, mailed Feb. 7, 2012, in corresponding European Application No. 09830020.5 (8 pp.).

$3^{rd}$ *Generation Partnership Project; Technical Specification Group Radio Access Network; High Speed Packet Access (HSPA) evolution; Frequency Division Duplex (FDD) (Release 7)*, 3GPP TR 25.999, V7.0.1, Dec. 2007, pp. 1-58.

International Search Report, mailed Mar. 11, 2010, in corresponding International Application No. PCT/CN2009/075267 (4 pp.).

Chinese Office Action mailed Jan. 4, 2013 for corresponding Chinese Application No. 200810218039.5.

Chinese Office Action mailed Jun. 4, 2013 in corresponding Chinese Application No. 200810218039.5.

* cited by examiner

COMMUNICATION NETWORK, DEVICE, AND METHOD

CROSS-REFERENCE TO RELATED APPLICATIONS

This application is a continuation of International Application No. PCT/CN2009/075267, filed on Dec. 2, 2009, which claims priority to Chinese Patent Application No. 200810218039.5, filed on Dec. 2, 2008, both of which are hereby incorporated by reference in their entireties.

FIELD OF THE INVENTION

The present invention relates to communications technologies, and in particular, to a communication network, device, and method.

BACKGROUND OF THE INVENTION

With the development of communication technologies, operators are more and more eager to develop Internet services. However, because the Packet Switched (PS) network architecture of Wideband Code Division Multiple Access (WCDMA) basically inherits the General Packet Radio Service (GPRS), the cost per megabyte cannot be reduced quickly even after the High-Speed Packet Access (HSPA) on air interface is deployed.

The 3rd Generation Partnership Project (3GPP) proposes a One Tunnel solution for the PS network architecture in Release 7 (R7). As shown in FIG. 1, this network architecture includes the following network elements:
NodeB 101;
Mobile backhaul 102;
Radio Network Controller (RNC) 103;
Serving GPRS Support Node (SGSN) 104;
Internet Protocol (IP) backbone 105;
Gateway GPRS Support Node (GGSN) 106; and
Public Data Network (PDN) 107.

The NodeB 101 is interconnected with the RNC 103 through an Iub interface over a mobile Iub transport network. The RNC 103 is interconnected with the SGSN 104 through an IuPS interface. The SGSN 104 is interconnected with the GGSN 106 through a Gn/Gc interface over the IP backbone 105. The GGSN 106 is interconnected with the PDN 107 through a Gi interface.

The basic principle of the One Tunnel solution is to let the control plane signaling go along the conventional path from the RNC 103 through the SGSN 104 to the GGSN 106, the User Plane (UP) data flow does not pass through the SGSN 104, and the RNC 103 is directly connected to the GGSN 106 through the Gn UP interface, so that the SGSN 104 is no longer a capacity bottleneck. However, in the One Tunnel solution, the PDN is still connected over the GGSN of the backbone network and therefore the efficiency of PS service transmission is low.

SUMMARY OF THE INVENTION

Embodiments of the present invention provide a communication network, device and method to increase transmission efficiency of mobile PS services.

A communication method provided in an embodiment of the present invention includes:
sending, by a Mobile Broadband Edge (MBB-Edge) node a traffic offloading indication to a NodeB according to a traffic offloading policy; and
directing, by the NodeB, UP data of a PS service to a PDN through a fixed broadband bearer network of an offloading path according to the traffic offloading indication.

An MBB-Edge node provided in an embodiment of the present invention includes:
an RNC function module, configured to send a traffic offloading indication to a NodeB according to a traffic offloading policy, where the traffic offloading indication instructs the NodeB to direct UP data of a PS service to a PDN through a fixed broadband bearer network of an offloading path.

A NodeB provided in an embodiment of the present invention includes a NodeB function module, an RNC PS UP function module and a GGSN UP function module, where:
the NodeB function module is configured to receive UP data of a PS service requested by a Mobile Station (MS) and send the UP data to the RNC PS UP function module;
the RNC PS UP function module is configured to receive an indication for offloading the UP data and send the UP data received by the NodeB function module to the GGSN UP function module; and
the GGSN UP function module is configured to direct the UP data received by the RNC PS UP function module to a PDN through a fixed broadband bearer network of an offloading path according to the traffic offloading indication.

A communication network provided in an embodiment of the present invention includes the above MBB-Edge node and the above NodeB.

Another communication network provided in an embodiment of the present invention includes:
a NodeB, including a NodeB function module, an RNC PS UP function module, and a GGSN UP function module, and configured to direct UP data of a PS service to a PDN through a fixed broadband bearer network of an offloading path; and
an MBB-Edge node, including an RNC function module and a GGSN function module, and configured to control the NodeB to execute traffic offload of the UP data of the PS service.

The embodiments of the present invention help to increase the transmission efficiency of mobile PS services and reduce costs.

BRIEF DESCRIPTION OF THE DRAWINGS

To better explain the technical solution of the embodiments of the present invention or the prior art, the accompanying drawings required in the description of the embodiments of the present invention or the prior art are briefly described. It is apparent that the accompanying drawings illustrate only some exemplary embodiments of the present invention. Those skilled in the art can derive other drawings from these drawings without creative efforts.

DETAILED DESCRIPTION OF THE EMBODIMENTS

To better explain the technical solution of the present invention, the embodiments of the present invention are described in detail with reference to the accompanying drawings. It is apparent that the embodiments herein are only some exemplary embodiments of the present invention. Based on the embodiments herein, those skilled in the art can derive other embodiments without creative efforts and such other embodiments all fall within the protection scope of the present invention.

Figure 1:
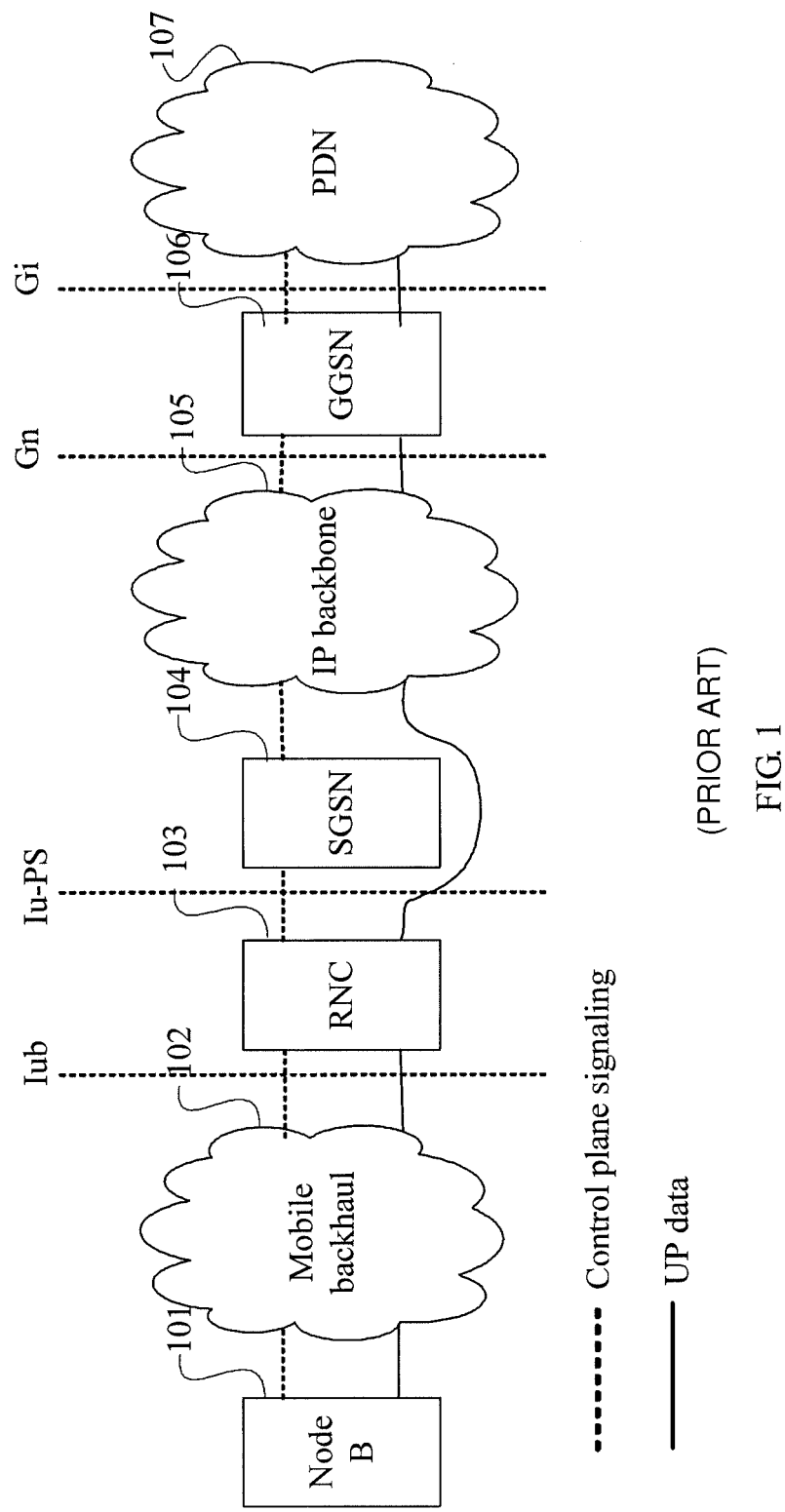
FIG. 1 is a schematic structural diagram of a PS network in a prior art.
Figure 2:
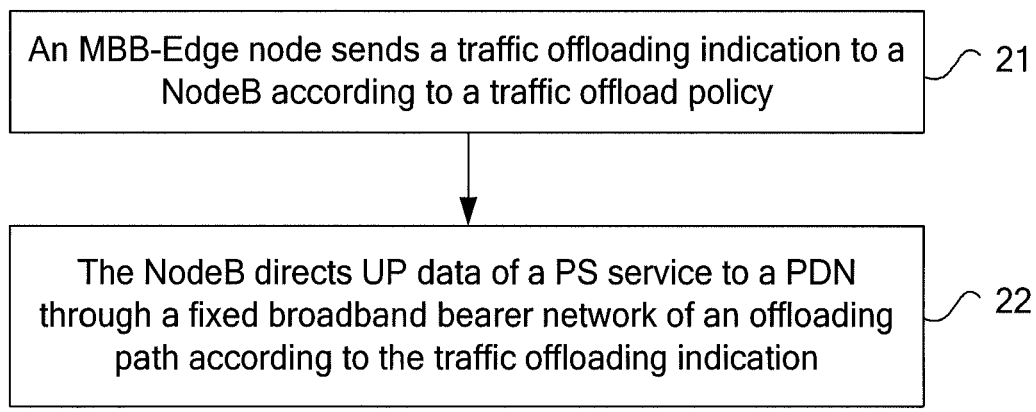
FIG. 2 is a flowchart of a communication method according to an embodiment of the present invention.

FIG. 2 is a flowchart of a communication method according to an embodiment of the present invention. As shown in FIG. 2, the method includes the following steps:

21. An MBB-Edge node sends a traffic offloading indication to a NodeB according to a traffic offloading policy.

The MBB-Edge node may obtain the traffic offloading policy in advance. The present invention does not limit how a wireless integrated service gateway (WISG) obtains the traffic offloading policy. For example, the MBB-Edge node receives and stores the traffic offloading policy sent by an Operation and Maintenance Center (OMC) and the traffic offloading policy is preset by the OMC according to the operation policies of PS services; or, when an MS activates a PS service, the MBB-Edge node sends service information of the PS service to a policy server and the MBB-Edge node receives the traffic offloading policy, in which the policy is decided by the policy server according to the service information.

The MBB-Edge node decides, according to the traffic offloading policy, whether it is necessary to perform traffic offloading on the UP data of the PS service. When the traffic offloading policy indicates that the UP data of the PS service requires traffic offloading, the MBB-Edge node sends the traffic offloading indication to the NodeB. The traffic offloading indication is used to instruct the NodeB to direct the UP data of the PS service to a PDN through a fixed broadband bearer network of an offloading path.

22. The NodeB directs the UP data of the PS service to the PDN through the fixed broadband bearer network of the offloading path according to the traffic offloading indication.

Alternatively, when the traffic offloading policy indicates that the UP data of the PS service does not require traffic offloading, the MBB-Edge node sends a non traffic offloading indication to the NodeB. The non traffic offloading indication is used to instruct the NodeB to send the UP data of the PS service to the MBB-Edge node. In this case, the NodeB sends the UP data of the PS service to the MBB-Edge node according to the non traffic offloading indication. The MBB-Edge node receives the UP data of the PS service and directs the UP data of the PS service to the PDN.

The embodiment of the present invention provides a communication method that enables mobile broadband access, where the MBB-Edge node controls the NodeB to perform proper traffic offloading on the UP data of a PS service according to a traffic offloading policy, so that some traffic is directed by the NodeB to the PDN through a fixed broadband bearer network of the offloading path. Alternatively, some traffic can be directed by the NodeB to the PDN through a WISG. Therefore, the efficiency of mobile PS service transmission is increased.

In all embodiments of the present invention, the MBB-Edge node may be an RNC that controls the NodeB to offload traffic according to the traffic offloading policy, so that the RNC can control the NodeB to direct the UP data of some PS services to the PDN through a fixed broadband bearer network of the offloading path. Or, the MBB-Edge node is a WISG that integrates all RNC functions and some or all functions of a GGSN. In this case, the WISG can control the NodeB to direct the UP data of some PS services to the PDN through a fixed broadband bearer network of the offloading path, and/or the WISG can control the NodeB to send the UP data of some PS services to the WISG and the WISG then directs the UP data to the PDN. The embodiments of the present invention do not limit the implementation of the MBB-Edge node if the MBB-Edge node implements the above function.

In all embodiments of the present invention, the NodeB may integrate some RNC PS UP functions and some GGSN UP functions. In this case, the NodeB can direct the UP data of some PS services to the PDN through a fixed broadband bearer network of the offloading path according to the indication of the MBB-Edge node, and/or the NodeB can send the UP data of some PS services to the WISG according to the indication of the MBB-Edge node and the WISG then directs the UP data to the PDN. The embodiments of the present invention do not limit the implementation of the NodeB if the NodeB implements the above function.

Figure 3A:
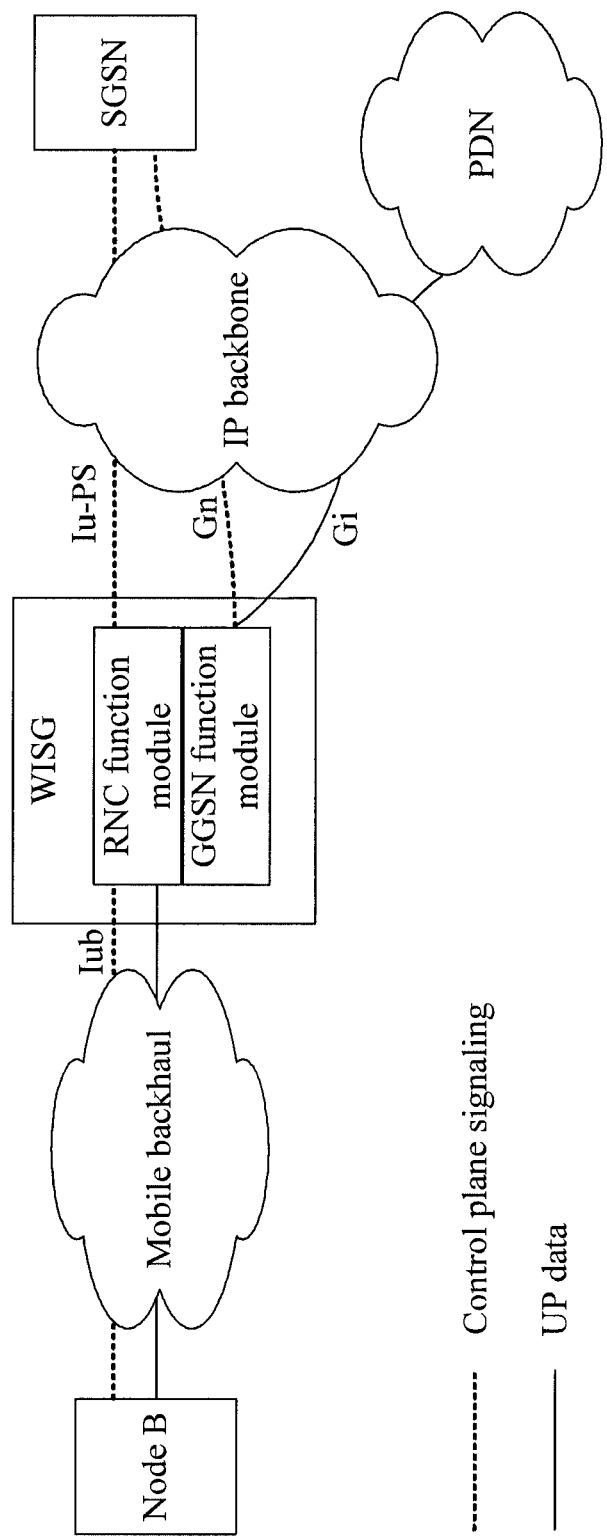
FIG. 3*a* is a schematic structural diagram of a communication network in an application scenario according to an embodiment of the present invention.

FIG. 3a is a schematic structural diagram of a communication network in an application scenario according to an embodiment of the present invention. As shown in FIG. 3a, the communication network includes:

a NodeB;

a mobile backhaul;

a WISG, which, for example, includes an RNC function module and a GGSN function module, where the RNC function module integrates all RNC functions including radio resource management, cell management, NodeB management, user access management, and UP data processing; and the GGSN function module integrates some or all GGSN functions, including user session management, charging, interception, and GPRS tunneling protocol processing such as GPRS Tunneling Protocol-UP (GTPU);

an IP backbone;

an SGSN; and a PDN.

In the communication network shown in FIG. 3a, the dashed lines indicate the transmission path of control plane signaling and the continuous lines indicate the transmission path of UP data. The WISG integrates all or some functions of the RNC and GGSN. The transmission path of control plane signaling is "NodeB-WISG-SGSN-WISG". The transmission path of UP data is "NodeB-WISG-PDN" without passing through the SGSN. Therefore, "NodeB-WISG" two-layer flat network architecture is formed.

Because the WISG integrates all functions of the RNC, it can be deployed according to a conventional RNC deployment policy without changing the existing Circuit Switched (CS) network architecture. This helps to save the cost of network upgrading and solve such issues as a long transmission path of PS user data and a large number of nodes in the path. Thereby, the present invention reduces mobile broadband network costs and increases the transmission efficiency of mobile PS services.

It should be noted that the communication method shown in FIG. 3a relates to only one application scenario of the present invention. The communication method in the embodiment of the present invention is also applicable to scenarios other than that shown in FIG. 3a. For example, the RNC controls the NodeB to perform traffic offloading on UP data of a PS service. In this case, the RNC is capable of controlling the NodeB to perform traffic offloading on the UP data of the PS service according to a traffic offloading policy. When the RNC decides that it is necessary to perform traffic offloading on the UP data of the PS service according to the traffic offloading policy, the RNC sends a traffic offloading indication to the NodeB. The NodeB directs the UP data of the PS service to the PDN through a fixed bearer network according to the traffic offloading indication.

The following embodiments of the present invention explain a communication method based on a WISG by taking only the scenario shown in FIG. 3a as an example, to further increase the transmission efficiency of the PS service. The scenario that the RNC is capable of controlling the NodeB to perform traffic offloading on the UP data of the PS service according to the traffic offloading policy is not described.

Figure 3B:
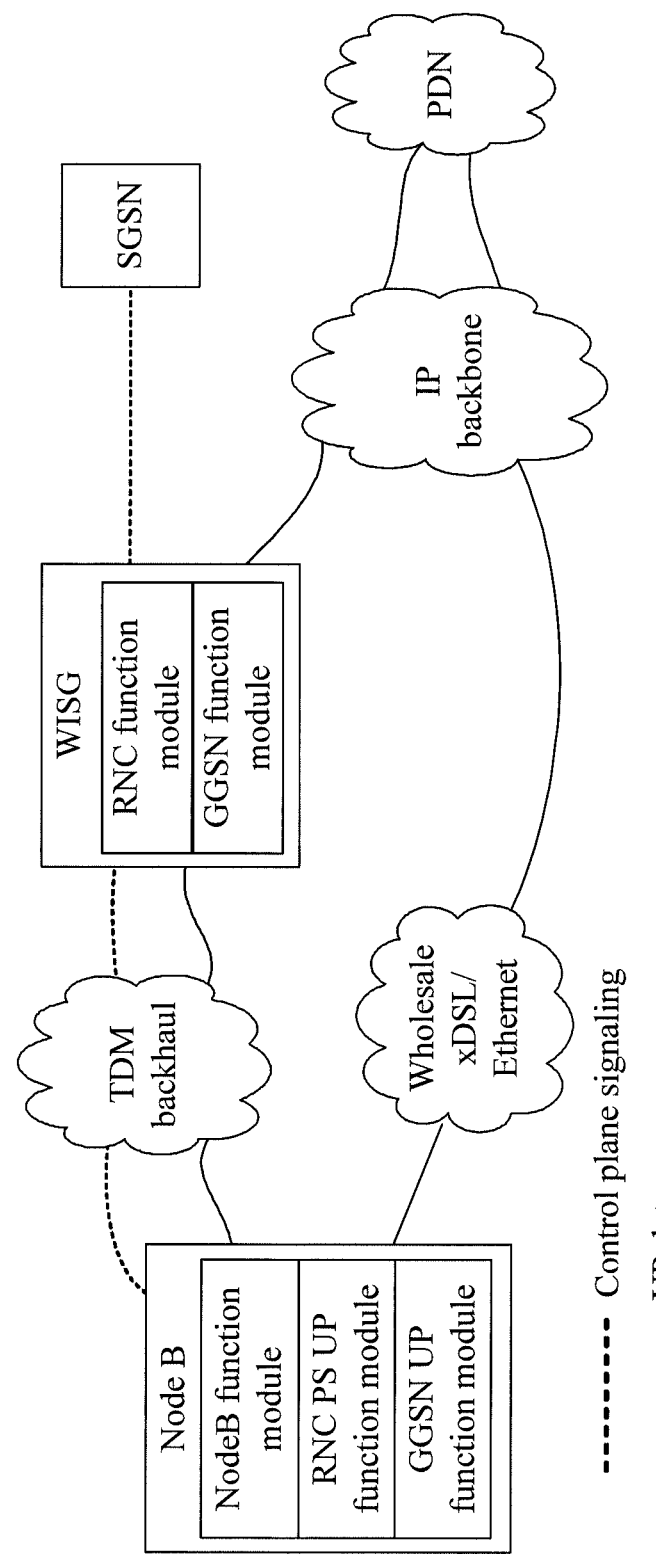
FIG. 3*b* is a schematic structural diagram of a network according to an embodiment of the present invention.

FIG. 3b is a schematic structural diagram of a network according to an embodiment of the present invention. As shown in FIG. 3b, the communication network includes a NodeB, a WISG, an SGSN, a fixed broadband bearer network, and a PDN. The NodeB and the WISG are connected via a Time Division Multiplexing (TDM) backhaul. The fixed broadband bearer network is connected to the PDN through an IP backbone at one end and connected to the NodeB at the other end.

The WISG in the embodiment of the present invention provides the following benefits:

1. The CS domain architecture is not changed, and CS services and CS core network devices are not affected.

2. PS services and PS core network devices are not affected; a PS core network device only requires additional configuration for interworking with the WISG.

3. The WISG is connected directly to the PDN via the Gi interface, which saves the cost of the SGSN or GGSN.

As shown in FIG. 3b, the NodeB integrates some RNC PS UP functions and some GGSN UP functions. The NodeB directs some PS services UP data to the PDN through the fixed broadband bearer network, such as the Digital Subscriber Line (xDSL) and Passive Optical Network (xPON) according to the indication of the WISG. Therefore, the embodiment of the present invention provides xDSL-like access through an offloading path, or the present invention achieves Mobile Digital Subscriber Loop (Mobile DSL) access.

In the embodiment of the present invention, the NodeB integrates some RNC PS UP functions and some GGSN UP functions. The NodeB includes a NodeB function module, an RNC PS UP function module, and a GGSN UP function module. When the NodeB receives a traffic offloading indication from the WISG, the NodeB directs the PS UP data to the PDN though the fixed bearer network of the offloading path.

Figure 3C:
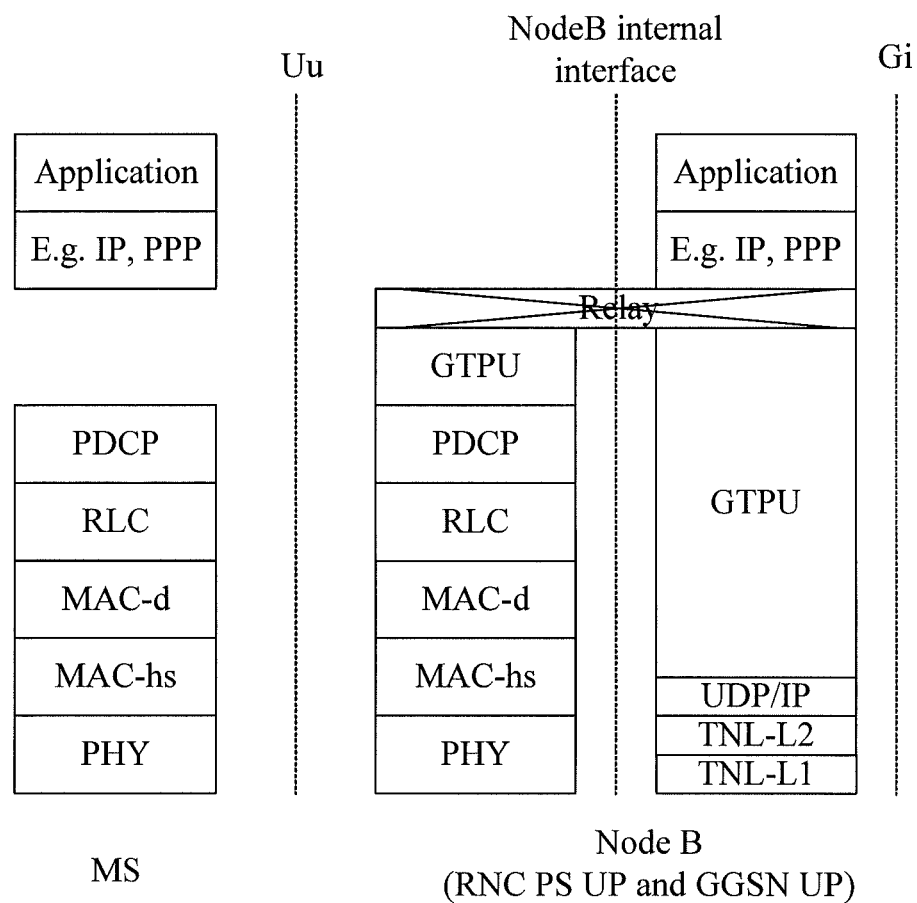
FIG. 3*c* is a schematic diagram of a High Speed Downlink Packet Access (HSDPA) UP protocol stack of a NodeB according to an embodiment of the present invention.

FIG. 3c is a schematic diagram of an HSDPA UP protocol stack of the NodeB according to an embodiment of the present invention. As shown in FIG. 3c, in an HSDPA application, the NodeB may integrate some RNC PS UP functions, for example, Physical layer (PHY), Medium Access Control (MAC, such as MAC-d and MAC-hs), Radio Link Control (RLC), Packet Data Convergence Protocol (PDCP), and GTPU. The NodeB may also integrate some GGSN UP functions, such as TNL-L1, TNL-L2, User Datagram Protocol (UDP) or IP, and GTPU.

Figure 3D:
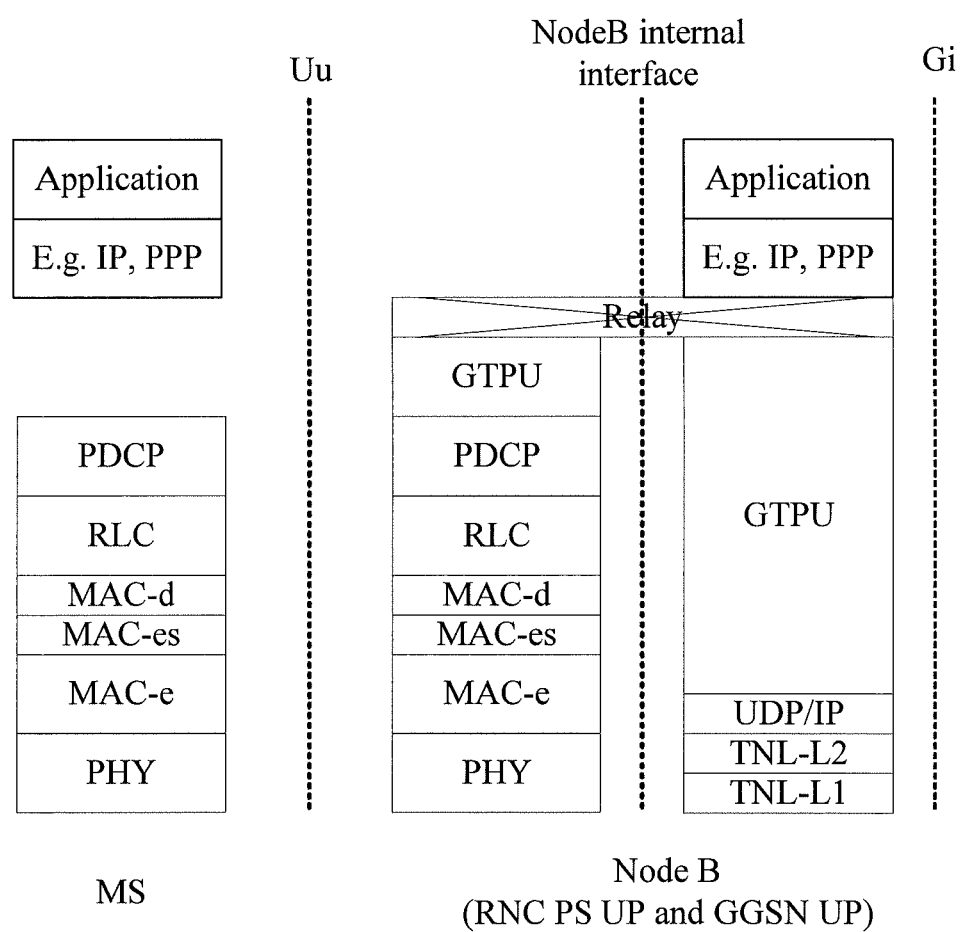
FIG. 3*d* is a schematic diagram of a High Speed Uplink Packet Access (HSUPA) UP protocol stack of a NodeB according to an embodiment of the present invention.

FIG. 3d is a schematic diagram of a High Speed Uplink Packet Access (HSUPA) UP protocol stack of the NodeB according to an embodiment of the present invention. As shown in FIG. 3d, in an HSUPA application, the NodeB may integrate some RNC PS UP functions, such as PHY, MAC-d, MAC-es, MAC-s, RLC, PDCP, and GTPU; the NodeB may also integrate some GGSN UP functions, such as TNL-L1, TNL-L2, UDP/IP, and GTUP.

In the UP protocol stacks shown in FIG. 3c and FIG. 3d, the interconnection of internal modules of the NodeB, such as the interconnection between the RNC PS UP function module and the GGSN UP function module, can be flexibly designed. For example, the Iub-FP protocol layer may be spared; or the GTPU layer may be cancelled so that application layer data of a user is directly extracted from PDCP Protocol Data Unit (PDU) and the UP data is directly sent to the PDN through the Gi interface of the GGSN UP function module (which is not shown in the figures).

The WISG controls the NodeB to direct some PS UP data to the PDN through a fixed bearer network of the offloading path according to the traffic offloading policy, which is like the DSL broadband access of mobile PS UP data, the PS UP data need not pass through a GGSN in the backbone network and therefore the efficiency of PS service transmission is increased.

Figure 4:
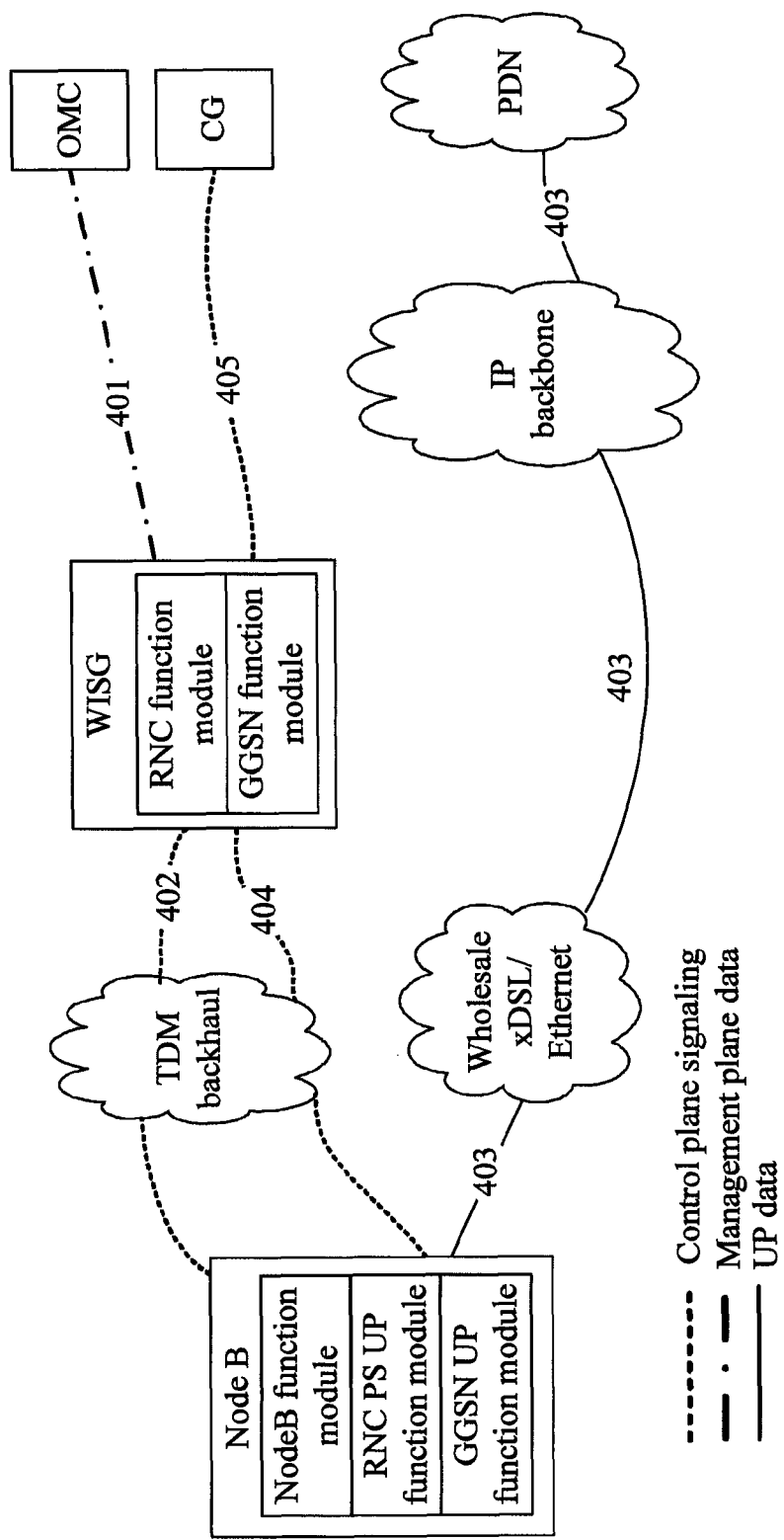
FIG. 4 is a schematic structural diagram of a network according to an embodiment of the present invention.

FIG. 4 is a schematic structural diagram of another network according to an embodiment of the present invention. The communication network shown in FIG. 4 is different from the network shown in FIG. 3b in that the PS service traffic offloading policy may be preset on the WISG. For example, in addition to the network elements shown in FIG. 3b, the communication network shown in FIG. 4 may further include an OMC which interacts with the WISG through a management plane channel.

Alternatively, the OMC is configured to set the traffic offloading policy related to a PS service requested by an MS and send the traffic offloading policy to the WISG. The WISG receives and stores the traffic offloading policy.

In the embodiment of the present invention, the WISG includes an RNC function module and a GGSN function module. The RNC function module integrates all functions of an RNC and the GGSN function module integrates all or some functions of a GGSN. The WISG can control the NodeB to direct some PS UP data to a PDN through a fixed broadband bearer network of the offloading path, and/or control the NodeB to send some PS UP data to the WISG and then the WISG directs the PS UP data to the PDN. The module structure of the WISG shown in FIG. 4 is only an example. The WISG may include other modules according to practical needs, for example, a policy obtaining module configured to obtain the traffic offloading policy (not shown in FIG. 4).

In the embodiment of the present invention, the NodeB includes a NodeB function module, an RNC PS UP function module, and a GGSN UP function module. The NodeB function module integrates all functions of a NodeB; the RNC PS UP function module integrates some RNC PS UP functions; and the GGSN UP function module integrates some GGSN UP functions. The NodeB directs some PS UP data to the PDN through a fixed broadband bearer network of the offloading path according to the indication of the WISG, and/or the NodeB sends UP data of some PS services to the WISG according to the indication of the WISG and then the WISG directs the PS UP data to the PDN.

A traffic offload method for UP data in the network shown in FIG. 4 includes the following steps:

401. The OMC delivers a PS service traffic offloading policy to the WISG through a management plane channel. The WISG receives and stores the traffic offloading policy.

The traffic offloading policy indicates whether it is necessary to perform traffic offloading on the UP data of the PS service requested by the MS. The traffic offloading policy may be defined according to an operation policy of the PS service. For example, it is defined on the basis of an Access Point Name (APN). For Internet services, it is defined on the basis of an Access Point Name (APN). Or the traffic offloading policy is defined on the basis of an International Mobile Subscriber Identity (IMSI) or International Mobile Equipment Identity (IMEI), for example, the policy is so defined that only the packet data of data card users is offloaded; or the traffic offloading policy is defined on the basis of a cell, a Service Area Identifier (SAI) or other factors.

402. When the MS initiates a Packet Data Protocol (PDP) activation procedure, the WISG decides, according to the preset traffic offloading policy, whether it is necessary for the NodeB to perform traffic offloading on the UP data; and if so, the WISG interacts with the NodeB and controls the NodeB to perform traffic offloading.

If the traffic offloading policy stored by the WISG indicates that the UP data of the PS service requires traffic offloading, the WISG can send a traffic offloading indication to the NodeB, instructing the NodeB to perform traffic offloading on the UP data.

Alternatively, if in step 402, according to the traffic offloading policy, the WISG decides that traffic offloading on the UP data is not required, the WISG can send a non traffic offloading indication to the NodeB, instructing the NodeB not to perform traffic offloading on the UP data. The NodeB sends the UP data of the PS service to the WISG according to the indication. The WISG directs the UP data of the PS service to the PDN when receiving the UP data of the PS service sent by the NodeB.

403. Transfer the UP data over the offloading path.

The NodeB receives the traffic offloading indication that instructs the NodeB to perform traffic offloading on the UP data. According to the indication, the NodeB directs the UP data of the PS service requested by the MS to the PDN through a fixed broadband bearer network of the offloading path.

404. The NodeB reports user data traffic statistics to the WISG.

405. The WISG generates a Call Detail Record (G-CDR) and sends the G-CDR to a Charging Gateway (CG).

Figure 5:
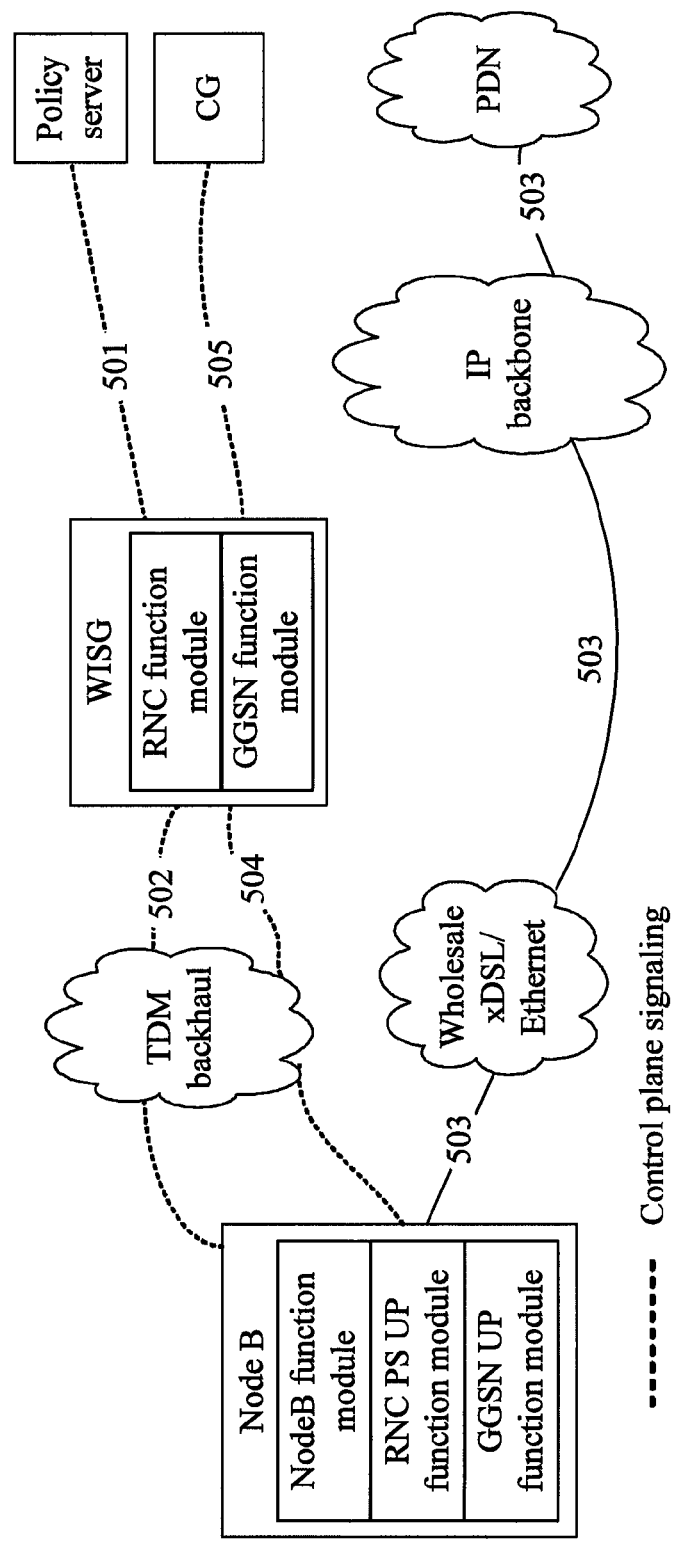
FIG. 5 is a schematic structural diagram of another network according to an embodiment of the present invention.

FIG. 5 is a schematic structural diagram of another network according to an embodiment of the present invention. The communication network shown in FIG. 5 is different from the network shown in FIG. 3b in that the WISG obtains the traffic offloading policy of a PS service during an activation process of the PS service. For example, in addition to the network elements shown in FIG. 3b, the communication network shown in FIG. 5 may further include a policy server which interacts with the WISG. Alternatively, the policy server may interact with the WISG through a third-party interface defined by an operator.

Alternatively, the policy server is configured to: obtain information of a PS service when the MS activates the PS service, determine, according to the information of the PS service, the traffic offloading policy of the PS service requested by the MS, and send the traffic offloading policy to the WISG. Accordingly, the WISG is configured to: when the MS activates the PS service, interact with the policy server to receive and store the traffic offloading policy sent by the policy server.

In the embodiment of the present invention, the WISG includes an RNC function module and a GGSN function module. The RNC function module integrates all functions of an RNC and the GGSN function module integrates all or some functions of a GGSN. The WISG can control the NodeB to direct some PS UP data to a PDN through a fixed broadband bearer network of the offloading path, and/or control the NodeB to send a portion of PS UP data to the WISG and then the WISG directs the PS UP data to the PDN. The module structure of the WISG shown in FIG. 5 is only an example. The WISG may include other modules according to practical needs, for example, a policy obtaining module configured to obtain the traffic offloading policy (not shown in FIG. 5).

In the embodiment of the present invention, the NodeB includes a NodeB function module, an RNC PS UP function module, and a GGSN UP function module. The NodeB function module integrates all functions of a NodeB; the RNC PS UP function module integrates some RNC PS UP functions; and the GGSN UP function module integrates some GGSN UP functions. The NodeB directs some PS UP data to the PDN through a fixed broadband bearer network of the offloading path according to the indication of the WISG, and/or the NodeB sends some PS UP data to the WISG according to the indication of the WISG and then the WISG directs the PS UP data to the PDN.

A traffic offload method for UP data in the network shown in FIG. 5 includes the following steps:

501. When an MS initiates a PS service activation procedure, the WISG interacts with the policy server and the policy server decides whether the PS service activation requires traffic offloading at the NodeB.

The WISG reports the service information, such as PDP context, MS location information, and user information, to the policy server; the policy server decides, according to the obtained service information, whether the service data of the PS service requested by the MS requires traffic offloading and sends the traffic offloading policy to the WISG.

502. If the service data requires traffic offloading at the NodeB, the WISG interacts with the NodeB and controls the NodeB to execute traffic offloading.

The WISG receives the traffic offloading policy sent by the policy server. If the traffic offloading policy indicates that the UP data of the PS service requires traffic offloading, the WISG sends an indication to the NodeB, for example, an indication that instructs the NodeB to perform traffic offloading on the UP data of the PS service.

503. Transfer the UP data over the offloading path.

The NodeB receives the traffic offloading indication. According to the indication, the NodeB directs the UP data of the PS service requested by the MS to the PDN through a fixed broadband bearer network of the offloading path.

504. The NodeB reports user data traffic statistics to the WISG.

505. The WISG generates a CDR and sends the CDR to a CG

Alternatively, based on the above technical solution, if the WISG decides, according to the traffic offloading policy, that the NodeB need not perform traffic offloading on the UP data, the WISG interacts with the NodeB to send an indication to the NodeB, such as an indication that instructs the NodeB not to perform traffic offloading on the UP data of the PS service. The NodeB sends the UP data to the WISG according to the indication. The WISG directs the UP data to the PDN when receiving the UP data sent by the NodeB.

In the embodiments shown in FIG. 4 and FIG. 5, 2-layer flat architecture (NodeB-WISG) and 1-layer flat architecture (NodeB) are combined to improve the transmission performance and increase the transmission efficiency of mobile packet data; through the cooperation of the WISG and the OMC or policy server, the WISG controls the NodeB to provide the Gi interface directly, which is like DSL broadband access. Therefore, not only the transmission cost of the last mile but also the cost of the RNC and xGSN are reduced.

Figure 6A:
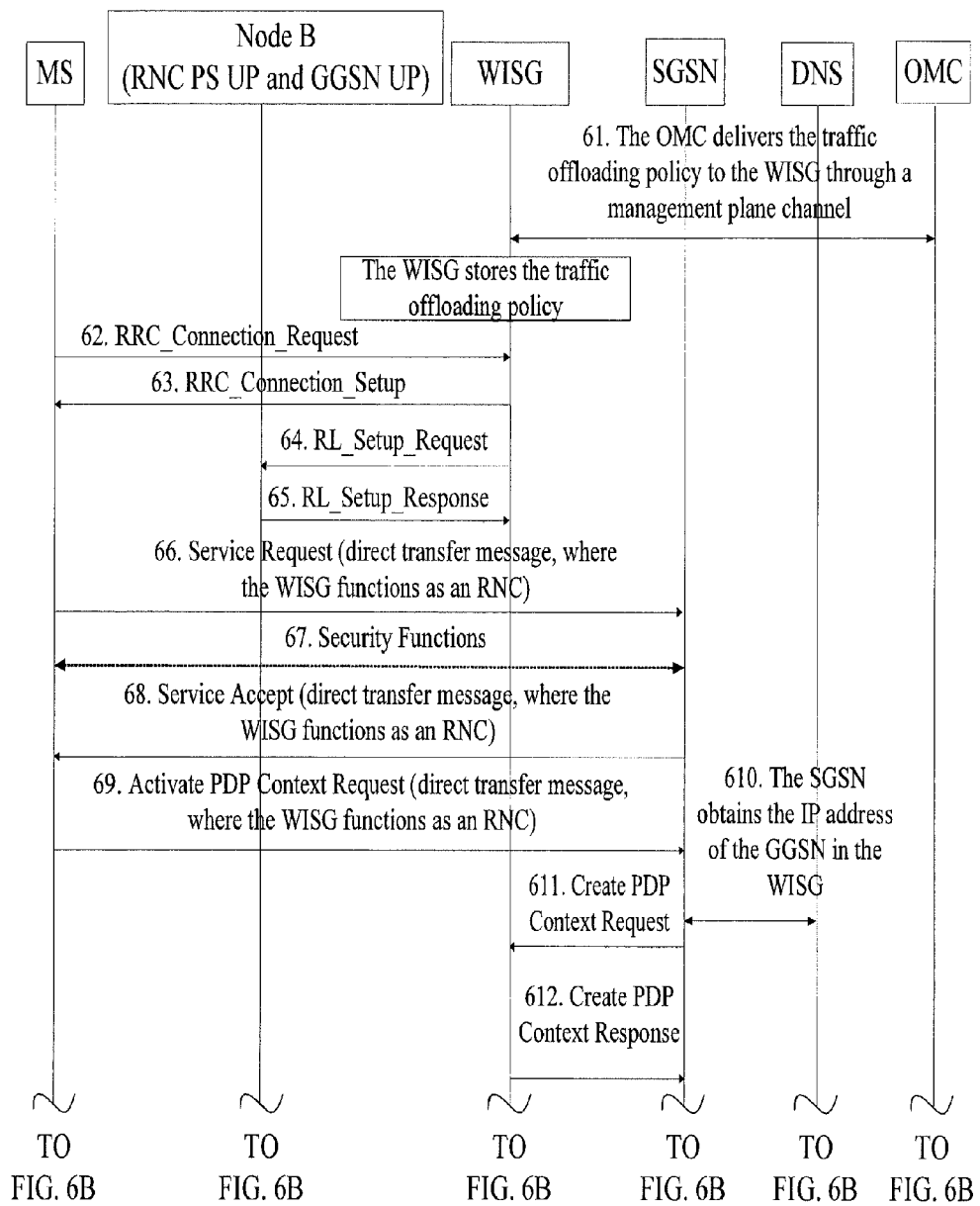
FIGS. 6A and 6B are a schematic diagram of a traffic offload control procedure in a communication network according to an embodiment of the present invention.
Figure 6B:
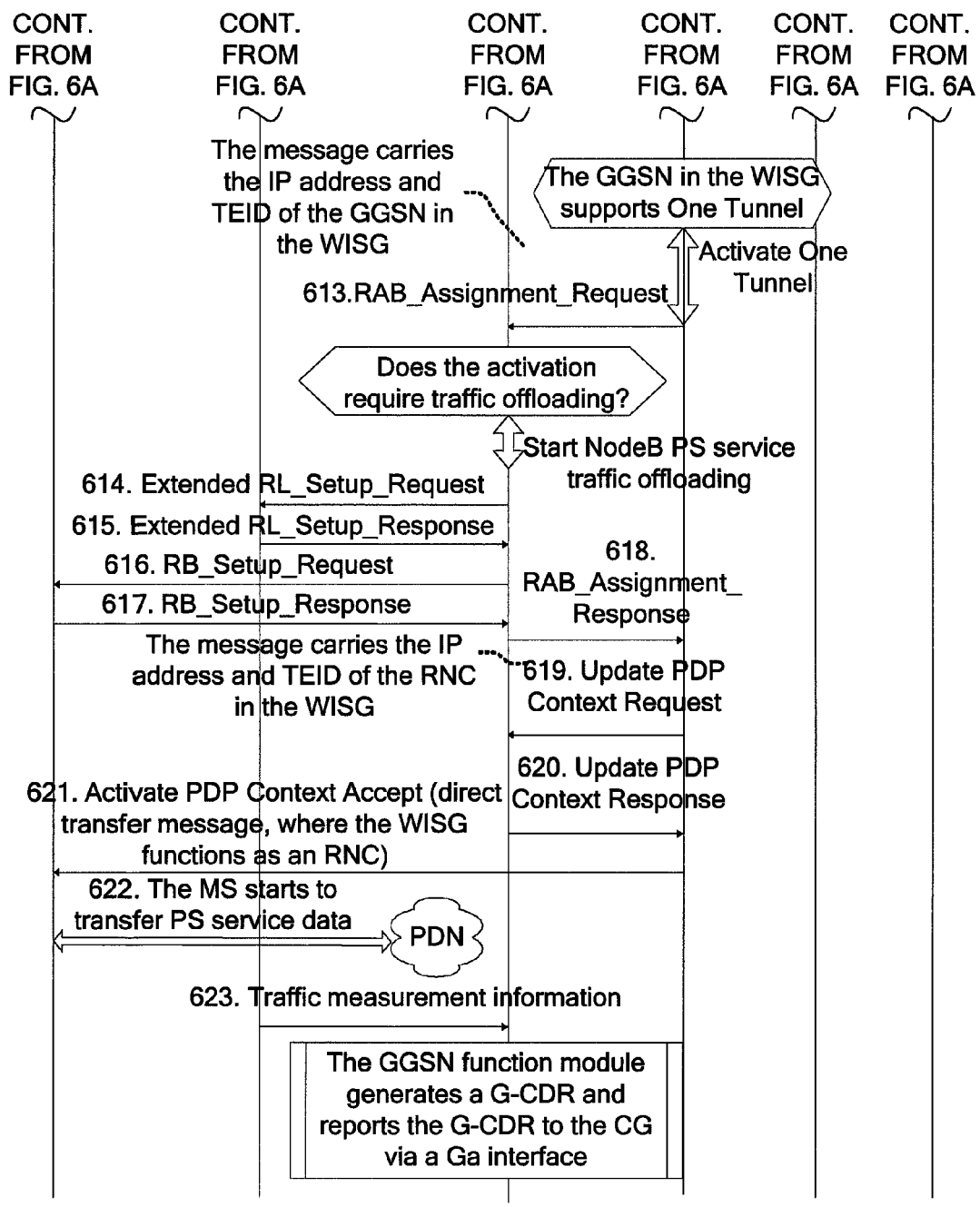

FIG. 6 is a schematic diagram of a traffic offload control procedure in a communication network according to an embodiment of the present invention.

In the embodiment of the present invention, the WISG includes an RNC function module and a GGSN function module. The RNC function module integrates all functions of an RNC and the GGSN function module integrates all or some functions of a GGSN. The WISG can control the NodeB to direct some PS UP data to a PDN through a fixed broadband bearer network of the offloading path, and/or control the NodeB to send some PS UP data to the WISG and then the WISG directs the PS UP data to the PDN. The module structure of the WISG shown in FIG. 6 is only an example. The WISG may include other modules according to practical needs, for example, a policy obtaining module configured to obtain the traffic offloading policy (not shown in FIG. 6).

In the embodiment of the present invention, the NodeB includes a NodeB function module, an RNC PS UP function module, and a GGSN UP function module. The NodeB function module integrates all functions of a NodeB; the RNC PS UP function module integrates some RNC PS UP functions; and the GGSN UP function module integrates some GGSN UP functions. The NodeB directs some PS UP data to the PDN through a fixed broadband bearer network of the offloading path according to the indication of the WISG, and/or the NodeB sends some PS UP data to the WISG according to the indication of the WISG and then the WISG directs the PS UP data to the PDN.

In the embodiment of the present invention, the WISG obtains the traffic offloading policy from an OMC and stores the policy locally. The traffic offload control procedure shown in FIG. 6 includes the following steps:

61. The OMC delivers the traffic offloading policy of a PS service to the WISG through a management plane channel.

The WISG receives and stores the traffic offloading policy.

The traffic offloading policy indicates whether the UP data of the PS service requested by the MS requires traffic offloading. The traffic offloading policy may be defined according to the operation policy of the PS service. Details are already provided in the description of step 401 and therefore are not provided here.

62. The MS sends an RRC_Connection_Request message to the WISG, where RRC stands for Radio Resource Control.

63. The WISG sends an RRC_Connection_Setup message to the MS.

64. The WISG sends an RL_Setup_Request message to the NodeB, where RL stands for Radio Link.

65. The NodeB sends an RL_Setup_Response message to the WISG.

66. The MS sends a Service Request message to the SGSN.

In this signaling procedure, the WISG functions as an RNC.

67. Initiate a Security Functions procedure. This step is optional.

68. The SGSN sends a Service Accept message to the MS.

69. The MS sends an Activate PDP Context Request message to the SGSN.

In this signaling procedure, the WISG functions as an RNC.

610. The SGSN obtains the IP address of the GGSN function module in the WISG from a Domain Name Server (DNS).

611. The SGSN sends a Create PDP Context Request message to the WISG.

612. The WISG sends a Create PDP Context Response message to the SGSN.

If the GGSN function module in the WISG supports One Tunnel, the SGSN can activate the One Tunnel mode.

613. The SGSN sends an RAB_Assignment_Request message to the WISG, where RAB stands for Radio Access Bearer. The message carries the IP address of the GGSN function module in the WISG and the available Tunnel Endpoint Identifier (TEID).

The WISG may decide, according to the obtained traffic offloading policy, whether it is necessary to activate a traffic offload procedure. This embodiment of the present invention assumes that the PS service requested by the MS requires activation of the traffic offload procedure. In this case, the WISG starts the traffic offload function of the NodeB for the PS service.

The traffic offloading policy obtained by the WISG may include policy information indicating whether the mobile PS services related to different IMSIs require traffic offloading. In this case, the WISG decides whether the current mobile PS service requires traffic offloading according to the IMSI related to the MS.

Or, the traffic offloading policy obtained by the WISG may include policy information indicating whether different types of service require traffic offloading. For example, the policy may be defined that Point To Point (P2P) services require traffic offloading and that value-added services do not require traffic offloading. The WISG searches for policy information related to the type of the PS service requested by the MS in the traffic offloading policy. If the type of the PS service requested by the MS requires traffic offloading (for example, the traffic offloading policy indicates traffic offloading on low-value services and the PS service requested by the MS is a low-value service, such as the P2P service), the WISG starts the traffic offload function of the NodeB for the PS service.

614. The WISG sends an extended RL_Setup_Request to the NodeB.

The RL_Setup_Request can be extended to carry an indication that instructs the NodeB to perform traffic offloading on the UP data of the PS service.

615. The NodeB sends an extended RL_Setup_Response to the WISG.

After receiving the traffic offloading indication, the NodeB starts its traffic offload function and sends an RL_Setup_Response to the WISG. The RL_Setup_Response can be extended to carry response information indicating that the NodeB has started the traffic offload function.

In the above steps 614 and 615, the WISG and the NodeB can also allocate internal device resources related to the traffic offload of the PS service, so that UP data can be directed to the PDN by the set device resources through the fixed broadband bearer network.

616. The WISG sends an RB_Setup_Request to the MS, where RB stands for Radio Bearer.

617. The MS sends an RB_Setup_Response to the WISG.

618. The WISG sends an RAB_Assignment_Response to the SGSN.

619. The SGSN sends an Update PDP Context Request to the WISG. The message carries the IP address of the RNC function module in the WISG and the TEID of the RNC function module.

620. The WISG sends an Update PDP Context Response to the SGSN.

621. The SGSN sends an Activate PDP Context Accept message to the MS.

In this signaling procedure, the WISG functions as an RNC. The signaling is a standard Non Access Stratum (NAS) direct transfer message.

622. The MS transfers the UP data of the PS service and the NodeB performs traffic offloading on the UP data of the PS service requested by the MS, that is, the NodeB directs the UP data to the PDN through the fixed bearer network of the offloading path.

In this case, when the UP data is directed to the PDN, the UP data bypasses the WISG and the SGSN and is directed by the NodeB to the PDN through the fixed bearer network of the offloading path.

623. The NodeB sends traffic statistics of the MS to the WISG and the GGSN function module of the WISG generates a G-CDR and reports the G-CDR to the CG through a Ga interface.

The above traffic offload control procedure uses standard 3GPP-defined RRC, Iub, IuPS, and Gn messages. Steps 61, 62, 63, 64, 65, 67, 610, 616, 617, and 623 use standard Iub and RRC messages; steps 614 and 615 use extended Iub and RRC messages; steps 66, 68, 69, and 621 use standard NAS direct transfer messages; steps 613 and 618 use standard IuPS messages; and steps 611, 612, 619, and 620 use standard Gn messages.

Note that the above traffic offload control procedure is only an example and should not be understood as a static limitation to the messages required by the traffic offload control procedure and the message time sequence. For example, the messages or steps can be skipped or replaced by their equivalents according to practical needs of control; and the sequence of messages can also be adjusted according to the practical needs of control.

In the embodiment of the present invention, the WISG obtains the traffic offloading policy from the OMC, stores the policy locally, and controls the NodeB to offload traffic according to the policy. Therefore, the UP data of certain PS services such as the low-value services defined by the operator can be directed by the NodeB to the PDN through the fixed broadband bearer network. Therefore, transmission of the UP data of these services does not consume resources of conventional network elements including the RNC, SGSN, and GGSN. This helps to break the capacity bottleneck of these network elements and increase the transmission efficiency of PS services.

Figure 7A:
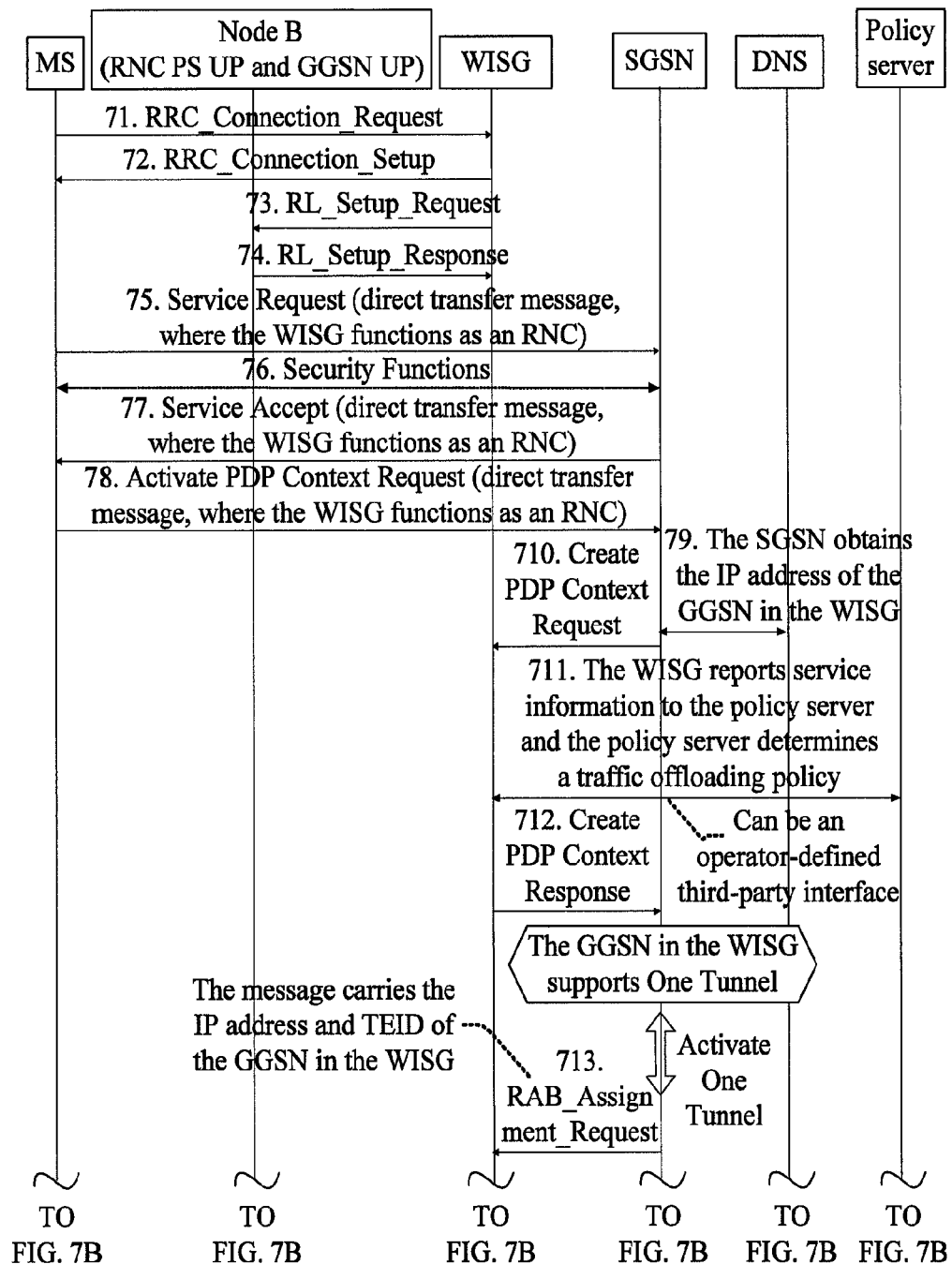
FIGS. 7A and 7B are a schematic diagram of another traffic offload control procedure in a communication network according to an embodiment of the present invention.
Figure 7B:
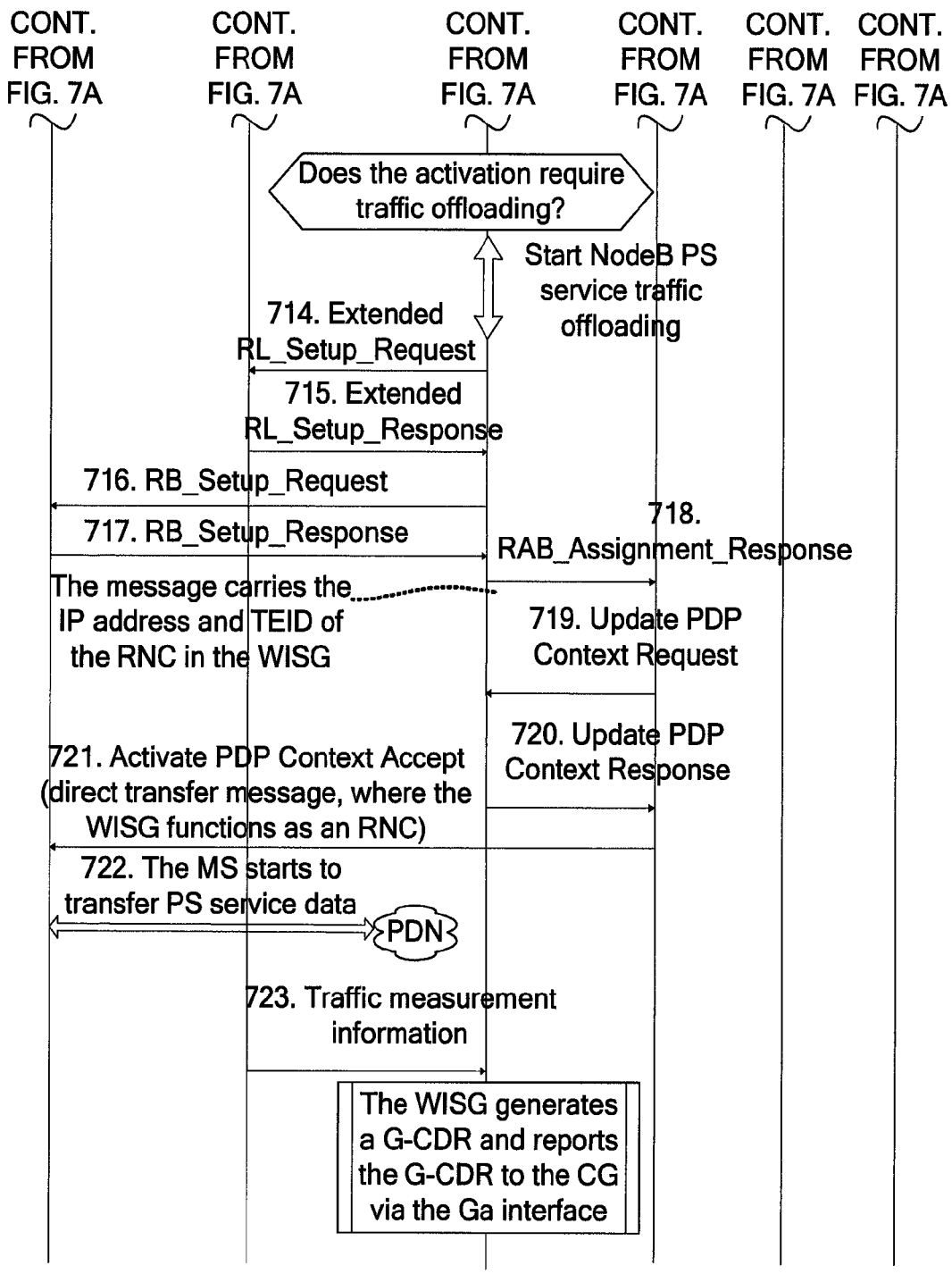

FIG. 7 is a schematic diagram of another traffic offload control procedure in a communication network according to an embodiment of the present invention.

In the embodiment of the present invention, the WISG includes an RNC function module and a GGSN function module. The RNC function module integrates all functions of an RNC and the GGSN function module integrates all or some functions of a GGSN. The WISG can control the NodeB to direct some PS UP data to a PDN through a fixed broadband bearer network of the offloading path, and/or control the NodeB to send some PS UP data to the WISG and then the WISG directs the PS UP data to the PDN. The module structure of the WISG shown in FIG. 7 is only an example. The WISG may include other modules according to practical needs, for example, a policy obtaining module configured to obtain the traffic offloading policy (not shown in FIG. 7).

In the embodiment of the present invention, the NodeB includes a NodeB function module, an RNC PS UP function module, and a GGSN UP function module. The NodeB function module integrates all functions of a NodeB; the RNC PS UP function module integrates some RNC PS UP functions; and the GGSN UP function module integrates some GGSN UP functions. The NodeB directs some PS UP data to the PDN through a fixed broadband bearer network of the offloading path according to the indication of the WISG, and/or the NodeB sends some PS UP data to the WISG according to the indication of the WISG and then the WISG directs the PS UP data to the PDN.

In this embodiment of the present invention, the WISG obtains the traffic offloading policy from the policy server when the MS activates a PS service. The traffic offload control procedure shown in FIG. 7 includes the following steps:

71-710. Similar to steps 62-611, and not described here.

711. The WISG reports service information of the PS service requested by the MS to the policy server. The service information of the PS service requested by the MS may include: PDP context, location information, and user information. The policy server decides a traffic offloading policy according to the received information and sends the traffic offloading policy to the WISG. The traffic offloading policy indicates whether the UP data of the PS service requested by the MS requires traffic offloading.

The WISG and the policy server may communicate with each other via a third-party interface defined by an operator. The policy server defines the traffic offloading policy according to the information reported by the WISG and sends the defined traffic offloading policy to the WISG.

712-723. Similar to steps 612-623, and not described here.

The above traffic offload control procedure uses standard 3GPP-defined RRC, Iub, IuPS, and Gn messages. Steps 71, 72, 73, 74, 76, 79, 716, 717, and 723 use standard Iub and RRC messages; steps 714 and 715 use extended Iub and RRC messages; steps 75, 77, 78, and 721 use standard NAS direct transfer messages; steps 713 and 718 use standard IuPS messages; and steps 710, 711, 712, 719, and 720 use standard Gn messages.

Note that the above traffic offload control procedure is only an example and should not be understood as a static limitation to the messages required by the traffic offload control procedure and the message time sequence. For example, the messages or steps can be skipped or replaced by their equivalents according to the practical needs of control; and the sequence of messages can also be adjusted according to the practical needs of control.

In this embodiment of the present invention, when the MS initiates a PS service activation procedure, the WISG reports the service information of the PS service to the policy server, and the policy server decides the traffic offloading policy according to the information in real time. The WISG controls the NodeB to offload traffic according to the traffic offloading policy, so that the NodeB directs the UP data of certain PS services such as low-value services to the PDN through the fixed broadband bearer network. Therefore, transmission of the UP data of these services does not consume resources of conventional network elements including the RNC, SGSN, and GGSN. This helps to break the capacity bottlenecks of these network elements and increase the transmission efficiency of PS services.

Figure 8:
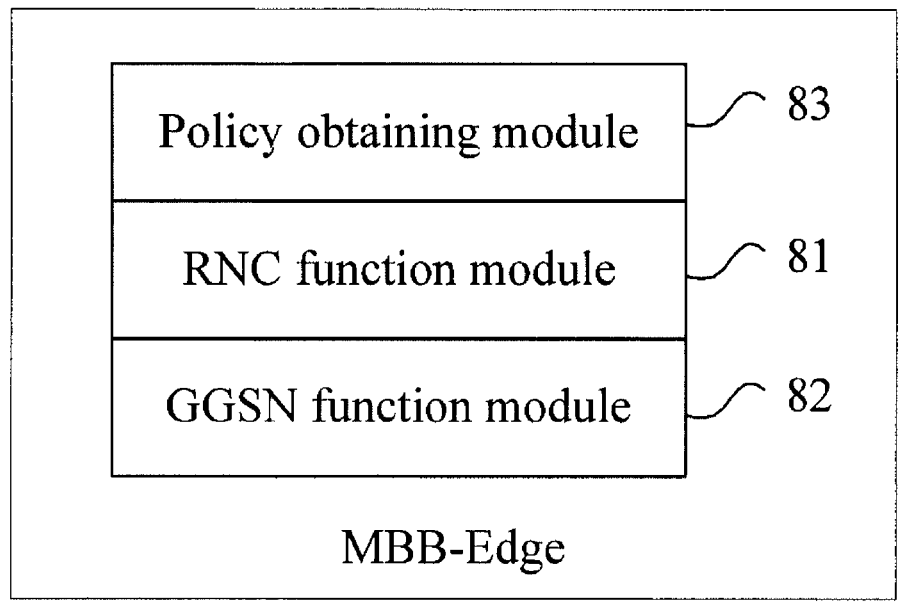
FIG. 8 is a schematic structural diagram of an MBB-Edge node according to an embodiment of the present invention.

FIG. 8 is a schematic structural diagram of an MBB-Edge node according to an embodiment of the present invention. As shown in FIG. 8, the MBB-Edge node includes an RNC function module 81.

The RNC function module 81 is configured to send a traffic offloading indication to a NodeB according to a traffic offloading policy, where the traffic offloading indication instructs the NodeB to direct the UP data of a PS service to a PDN through a fixed broadband bearer network of an offloading path.

The RNC function module integrates all RNC functions, including radio resource management, cell management, NodeB management, user access management, and UP data processing. Alternatively, the RNC function module is configured to send the traffic offloading indication to the NodeB when the traffic offloading policy indicates that the UP data of the PS service requires traffic offloading.

Based on the above technical solution, the MBB-Edge node may further include a GGSN function module 82.

The RNC function module 81 is further configured to send a non traffic offloading indication to the NodeB when the traffic offloading policy indicates that the UP data of the PS service does not require traffic offloading, where the non traffic offloading indication instructs the NodeB to send the UP data of the PS service to the MBB-Edge node. The RNC function module 81 also receives the UP data of the PS service sent by the NodeB and sends the UP data of the PS service to the GGSN function module 82.

The GGSN function module 82 is configured to direct the UP data of the PS service received from the RNC function module 81 to the PDN. The GGSN function module integrates some or all GGSN functions, including user session management, charging, interception, and GPRS tunneling protocol processing such as GTPU.

Based on the above technical solution, the MBB-Edge node may further include a policy obtaining module 83.

The policy obtaining module 83 is configured to obtain the traffic offloading policy. How the policy obtaining module obtains the traffic offloading policy is not limited by the present invention. Specifically, the policy obtaining module may receive and store the traffic offloading policy sent by an OMC, where the traffic offloading policy is preset by the OMC according to an operation policy of the PS service. The policy obtaining module may also send the service information of the PS service to a policy server when an MS activates the PS service and receive the traffic offloading policy, where the traffic offloading policy is determined by the policy server according to the service information.

The MBB-Edge node in the embodiment of the present invention controls the NodeB to perform proper traffic offloading on the UP data of a PS service according to a traffic offloading policy, so that some the traffic is directed by the NodeB to a PDN through a fixed broadband bearer network of the offloading path. Alternatively, a portion of the traffic can be directed by the MBB-Edge node to the PDN. Therefore, the transmission efficiency of mobile PS services is increased.

Figure 9:
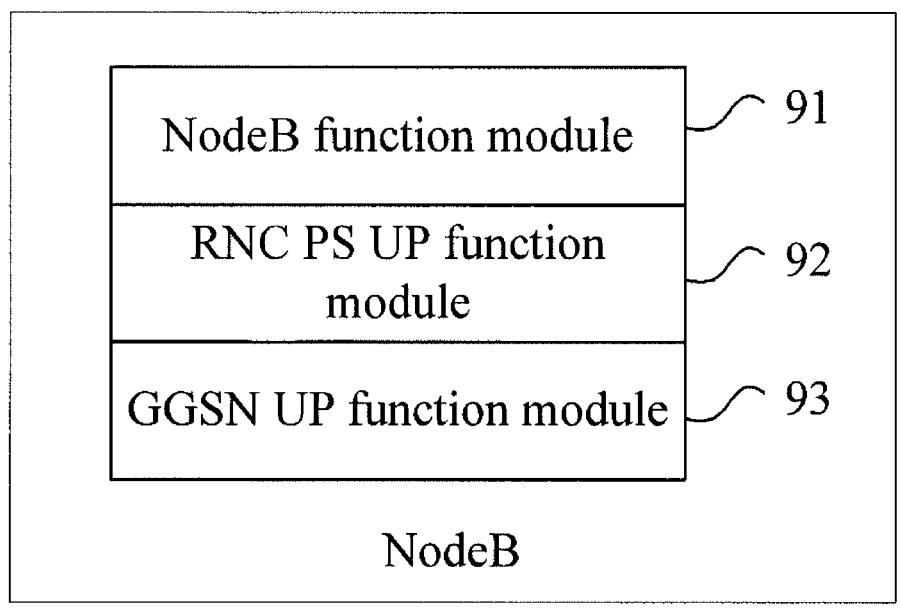
FIG. 9 is a schematic structural diagram of a NodeB according to an embodiment of the present invention.

FIG. 9 is a schematic structural diagram of a NodeB according to an embodiment of the present invention. As shown in FIG. 9, the NodeB includes a NodeB function module 91, an RNC PS UP function module 92, and a GGSN UP function module 93.

The NodeB function module 91 is configured to receive UP data of a PS service requested by an MS and send the UP data to the RNC PS UP function module.

The RNC PS UP function module 92 is configured to receive an indication for offloading the UP data and send the UP data received from the NodeB function module 91 to the GGSN UP function module 93.

The GGSN UP function module 93 is configured to direct the UP data received from the RNC PS UP function module 92 to a PDN through a fixed broadband bearer network of an offloading path according to the traffic offloading indication.

Alternatively, based on the above technical solution, the RNC PS UP function module 92 is further configured to receive an indication for not offloading traffic of the UP data. In this case, the NodeB function module 91 is further configured to send the UP data of the PS service to an MBB-Edge node according to the non traffic offloading indication, so that the UP data of the PS service is directed by the MBB-Edge node to the PDN.

The NodeB in the embodiment of the present invention integrates some RNC PS UP functions and some GGSN UP functions. The NodeB can perform proper traffic offloading on the UP data of a PS service under the instruction of the MBB-Edge node, so that some traffic is directed by the NodeB to a PDN through a fixed broadband bearer network of the offloading path. Alternatively, some traffic can be directed by the MBB-Edge node to the PDN. Therefore, the transmission efficiency of mobile PS services is increased. The RNC PS UP functions and GGSN UP functions integrated into the NodeB are illustrated in the NodeB UP protocol stacks shown in FIG. 3c and FIG. 3d and are not further described.

An embodiment of the present invention provides a communication system which includes an MBB-Edge node and a NodeB. The MBB-Edge node is configured to send a traffic offloading indication to the NodeB according to a traffic offloading policy. The NodeB is configured to direct the UP data of a PS service to a PDN through a fixed broadband bearer network of an offloading path according to the traffic offloading indication.

A structure of the MBB-Edge node is illustrated in FIG. 8 and a structure of the NodeB is illustrated in FIG. 9. In practice, the network can be deployed flexibly based on the MBB-Edge node and the NodeB if a communication system enabling mobile broadband access is achieved. The following describes exemplary networking of the communication system.

Figure 10:
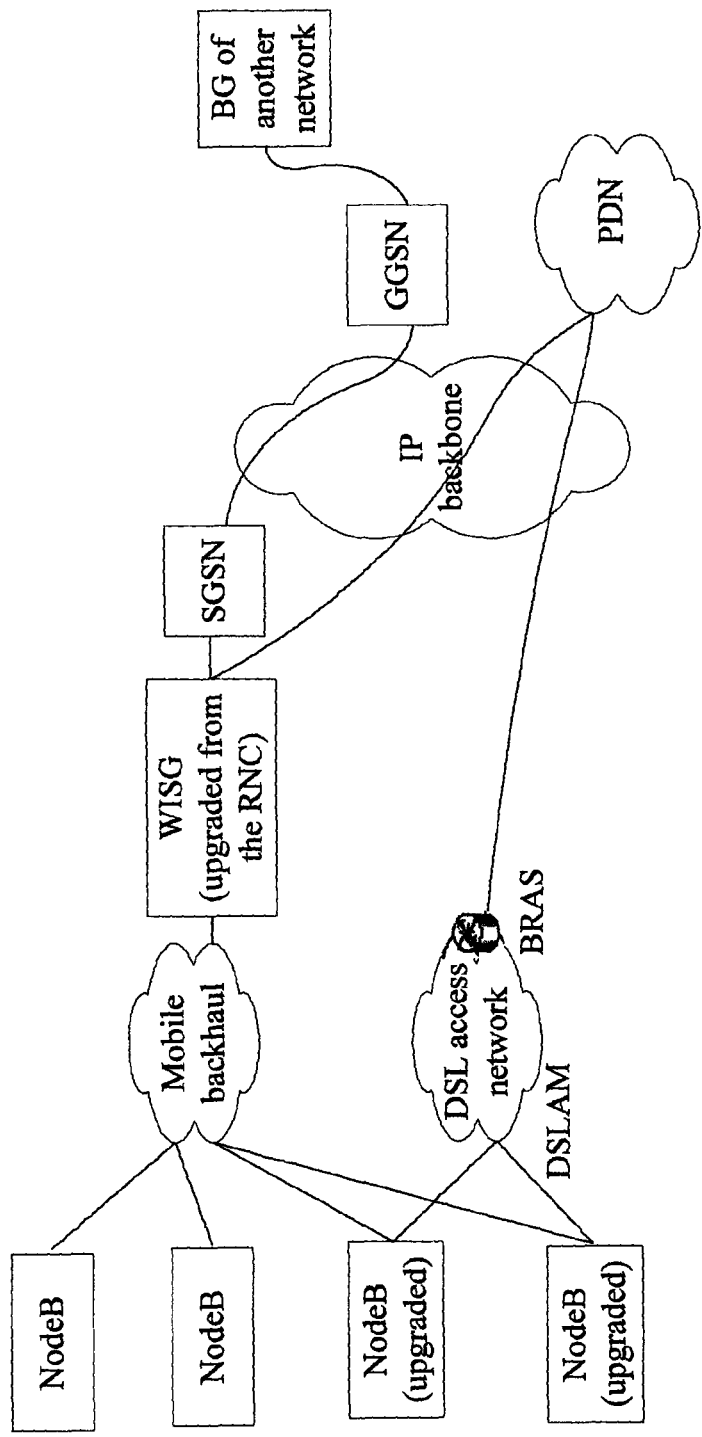
FIG. 10 is a schematic structural diagram of a new WCDMA network in an application scenario according to an embodiment of the present invention.

FIG. 10 is a schematic structural diagram of a new WCDMA network in an application scenario according to an embodiment of the present invention, where fixed broadband bearer resources for traffic offload exist. A new WCDMA network enabling mobile broadband access can be deployed by using the MBB-Edge node such as a WISG shown in FIG. 8 and the NodeB shown in FIG. 9.

As shown in FIG. 10, in the new WCDMA network, according to the One Tunnel standard, SGSNs similar to Mobile Switching Center (MSC) servers in the CS domain can be deployed in core cities, and the PS network will be like the softswitching architecture of the CS domain. A central GGSN can be deployed for convergence of the PS traffic of roaming users. When DSL resources are available, the traffic of the UP data of PS services can be offloaded according to the technical solution provided in the first embodiment of the present invention. The traffic offload control of different PS services is as follows:

1. For services of a user of the network roaming in another network, the transmission path of UP data is "visited NodeB-visited RNC-visited SGSN-visited Border Gateway (BG)-home GGSN". In this scenario, the UP data of PS services does not pass through the WISG.

2. For other services, the WISG interacts with the OMC or policy server to obtain a traffic offloading policy and perform traffic offloading on the UP data of PS services according to the traffic offloading policy. For example, for PS services that require no traffic offloading, the UP transmission path is "NodeB-WISG-PDN" (not shown in FIG. 10). For PS services that require traffic offloading, such as some low-value PS services, the UP data can be directed from the NodeB to the PDN. In this case, the UP data will not pass through the WISG. That is, the UP transmission path is "NodeB-PDN".

In this embodiment, the WISG and NodeB of the first embodiment of the present invention can be used in the new network. This satisfies the transmission needs of different service data and flexible UP data transmission schemes can be adopted according to the service type. An effective mobile broadband access solution can therefore be provided to increase the transmission efficiency of PS services.

Figure 11:
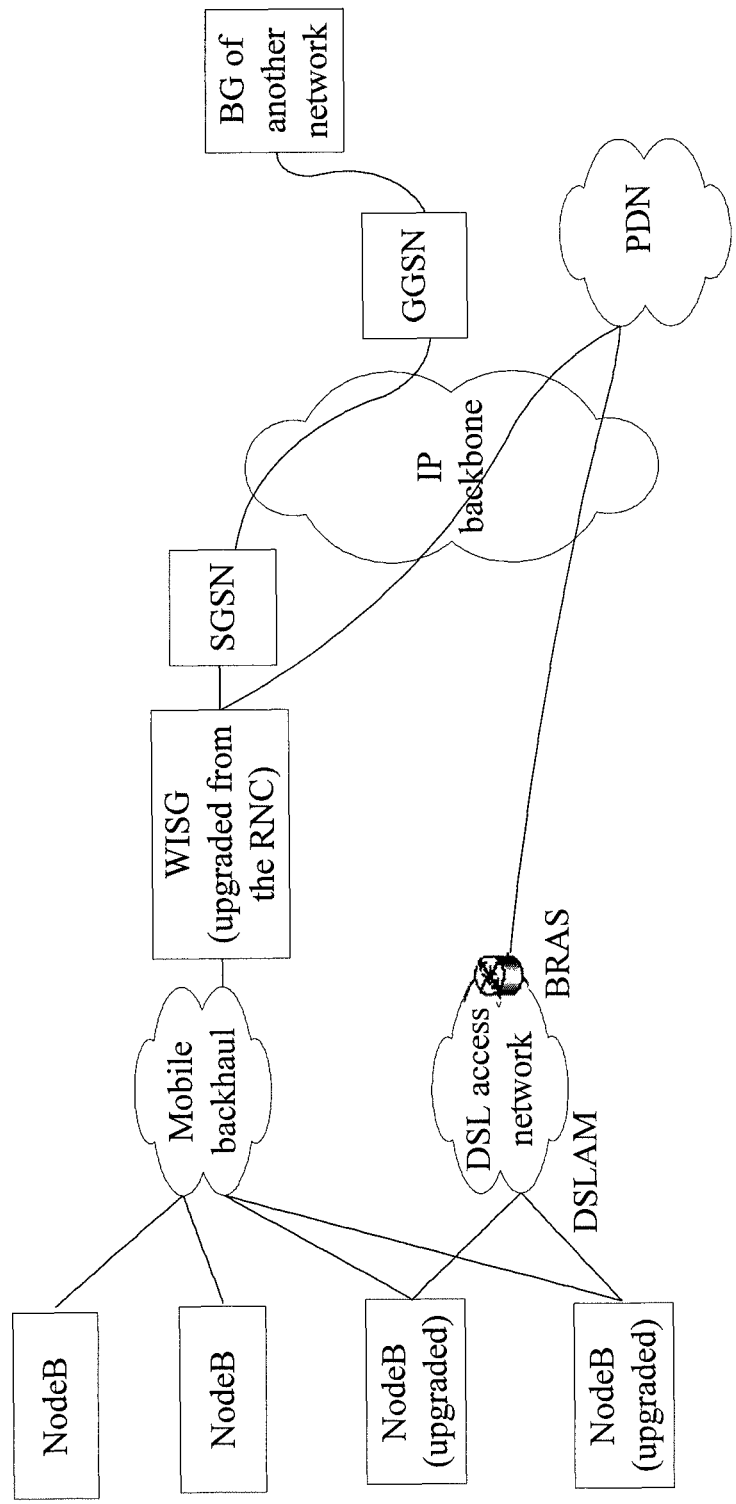
FIG. 11 is a schematic structural diagram of an existing upgraded WCDMA network in an application scenario according to an embodiment of the present invention.

FIG. 11 is a schematic structural diagram of an existing upgraded WCDMA network in an application scenario according to an embodiment of the present invention, where fixed broadband bearer resources for traffic offload exist. An existing WCDMA network can be upgraded to a WCDMA network enabling mobile broadband access by using the MBB-Edge node such as a WISG shown in FIG. 8 and the NodeB shown in FIG. 9.

As shown in FIG. 11, in an existing WCDMA network, the existing RNC can be upgraded to support the traffic offload of PS services through the addition of GGSN function boards and software upgrading, or direct software upgrading of redundant RNC hardware.

When the volume of UP packet data increases sharply, the NodeBs serving some hotspot areas can be upgraded so that the UP data of some PS services is directed by the upgraded NodeBs to the PDN. The traffic offload control of different PS services is as follows:

1. For Customized Application for Mobile network Enhanced Logic (CAMEL), interception, or value-added services provided by the operator, the transmission path of UP data is "NodeB-WISG upgraded from RNC-SGSN-GGSN".

2. For services of a user of the network roaming in another network, the transmission path of UP data is "visited NodeB-visited RNC-visited SGSN-visited BG-home GGSN". In this scenario, the UP data of PS services will not pass through the WISG upgraded from the RNC.

3. With regard to other services, the WISG interacts with the OMC or policy server to obtain a traffic offloading policy and perform traffic offloading on the UP data of PS services according to the traffic offloading policy. For example, for PS services that require no traffic offloading, the UP transmission path is "NodeB-WISG upgraded from RNC-PDN". For PS services that require traffic offloading, such as some low-value PS services, the UP data can be directed from the upgraded NodeB to the PDN. In this case, the UP data will not pass through the WISG. That is, the UP transmission path is "upgraded NodeB-PDN".

In this embodiment, some network elements in an existing network can be upgraded to adopt the WISG and NodeB of the first embodiment of the present invention. This satisfies the transmission needs of different service data and flexible UP data transmission schemes can be adopted according to the service type. An effective mobile broadband access solution can therefore be provided to increase the transmission efficiency of PS services.

From the exemplary networks shown in FIG. 10 and FIG. 11, it is apparent that a mobile broadband access solution including the MBB-Edge node shown in FIG. 8, such as the WISG, and the NodeB shown in FIG. 9, such as the NodeB, can be smoothly introduced in either a new network or an existing network. Therefore, the applicable scope of the embodiments of the present invention is wide.

Those skilled in the art understand that the accompanying drawings illustrate the exemplary embodiments of the present invention and that the modules or procedures in the accompanying drawings may probably not be necessary in the invention.

Those skilled in the art understand the modules of the apparatuses in the embodiments of the present invention may be disposed in the apparatuses as described in the embodiments of the present invention or disposed in one or more apparatuses other than the apparatuses in the embodiments of the present invention. The modules in the embodiments may be combined into one module or further decomposed to several submodules.

The sequence numbers of the embodiments are only for description purposes and do not imply the superiority or inferiority of the embodiments.

Those skilled in the art understand that all or some steps in the methods of the embodiments of the present invention can be implemented by hardware under the instruction of a program. The program may be stored in a computer readable storage medium and when the program is executed, the steps in the methods of the embodiments of the present invention are executed. The storage medium may be any medium that can store program codes, such as a Read Only Memory (ROM), a Random Access Memory (RAM), a magnetic disk, or a Compact Disk-Read Only Memory (CD-ROM).

Although the present invention has been described in detail through some exemplary embodiments, the invention is not limited to such embodiments. It is apparent that those skilled in the art can make various modifications, variations, and replacements to the invention without departing from the spirit and scope of the present invention. The invention is intended to cover the modifications, variations, and replacements if they fall within the scope of protection defined by the claims or their equivalents.

What is claimed is:

1. A communication method, comprising:
   sending, by a Mobile Broadband Edge (MBB-Edge) node, a traffic offloading or a non traffic offloading indication to a NodeB according to a traffic offloading policy; and
   according to a traffic offloading indication, directing, by the NodeB, User Plane (UP) data of a Packet Switched (PS) service to a Public Data Network (PDN) through a fixed broadband bearer network of an offloading path that bypasses UP data communication of the PS service through the MBB-Edge node,
   according to a non traffic offloading indication, sending, by the NodeB, the UP data of the PS service to the MBB-Edge node, and receiving, by the MBB-Edge node, the UP data of the PS service from the NodeB and directing the UP data of the PS service to the PDN.

2. The method of claim 1, before the sending, by the NodeB, the traffic offloading indication to the NodeB, further comprising:
   obtaining, by the MBB-Edge node, the traffic offloading policy.

3. The method of claim 2, wherein the obtaining, by the MBB-Edge node, the traffic offloading policy comprises:
   receiving and storing, by the MBB-Edge node, the traffic offloading policy sent by an Operation and Maintenance Center (OMC), wherein the traffic offloading policy is preset by the OMC according to an operation policy of the PS service; or sending, by the MBB-Edge node, service information of the PS service to a policy server when a Mobile Station (MS) activates the PS service, and receiving the traffic offloading policy, wherein the traffic offloading policy is determined by the policy server according to the service information.

4. The method of claim 1, wherein the sending, by the MBB-Edge node, the traffic offloading indication to the NodeB according to the traffic offloading policy comprises:

when the traffic offloading policy indicates that the UP data of the PS service requires traffic offloading, sending, by the MBB-Edge node, the traffic offloading indication to the NodeB, wherein the traffic offloading indication instructs the NodeB to direct the UP data of the PS service to the PDN through the fixed broadband bearer network of the offloading path.

5. The method of claim 1, wherein:

the MBB-Edge node has functions of a Radio Network Controller (RNC), or the MBB-Edge node has functions of the RNC and functions of a Gateway GPRS Support Node (GGSN), wherein GPRS stands for General Packet Radio Service; and the NodeB has PS UP functions of the RNC and UP functions of the GGSN.

6. A Mobile Broadband Edge (MBB-Edge) node, comprising:

a Radio Network Controller (RNC) function module, configured to send a traffic offloading or a non traffic offloading indication to a NodeB according to a traffic offloading policy, wherein the traffic offloading indication instructs the NodeB to direct User Plane (UP) data of a Packet Switched (PS) service to a Public Data Network (PDN) through a fixed broadband bearer network of an offloading path that bypasses UP data communication of the PS service through the MBB-Edge node, and the non traffic offloading indication instructs the Node B to direct the UP data of the PS service to the MBB-Edge node, thereby receiving, by the MBB-Edge node, the UP data of the PS service from the NodeB and directing the UP data of the PS service to the PDN.

7. The MBB-Edge node of claim 6, further comprising:

a policy obtaining module, configured to obtain the traffic offloading policy.

8. The MBB-Edge node of claim 7, wherein:

the policy obtaining module is configured to receive and store the traffic offloading policy sent by an Operation and Maintenance Center (OMC), wherein the traffic offloading policy is preset by the OMC according to an operation policy of the PS service; or the policy obtaining module is configured to send service information of the PS service to a policy server when a Mobile Station (MS) activates the PS service and receive the traffic offloading policy from the policy server, wherein the traffic offloading policy is determined by the policy server according to the service information.

9. The MBB-Edge node of claim 6, wherein:

the RNC function module is configured to send the traffic offloading indication to the NodeB when the traffic offloading policy indicates that the UP data of the PS service requires traffic offloading.

10. The MBB-Edge node of claim 6, further comprising a Gateway GPRS Support Node (GGSN) function module, wherein GPRS stands for General Packet Radio Service, wherein:

the RNC function module is further configured to, when the non traffic offloading indication instructs the NodeB to send the UP data of the PS service to the MBB-Edge node, receive the UP data of the PS service sent by the NodeB and send the UP data of the PS service to the GGSN function module; and the GGSN function module is configured to direct the UP data of the PS service received by the RNC function module to the PDN.

11. A NodeB, comprising a NodeB function module, a Radio Network Controller (RNC) Packet Switched User Plane (PS UP) function module and a Gateway GPRS Support Node (GGSN) User Plane (UP) function module, wherein GPRS stands for General Packet Radio Service, wherein a configuration of the NodeB comprises:

the NodeB function module is configured to receive UP data of a PS service requested by a Mobile Station (MS) and send the UP data to the RNC PS UP function module;

the RNC PS UP function module is configured to receive an indication for offloading the UP data and send the UP data received by the NodeB function module to the GGSN UP function module, the GGSN UP function module is configured to direct the UP data received by the RNC PS UP function module to a Public Data Network (PDN) through a fixed broadband bearer network of an offloading path that bypasses a Mobile Broadband Edge (MBB-Edge) node, according to a traffic offloading indication; and the RNC PS UP function module is further configured to receive an indication for not offloading UP data, the NodeB function module is further configured to send the UP data of the PS service to the Mobile Broadband Edge (MBB-Edge) node according to the non traffic offloading indication, so that the UP data of the PS service is directed by the MBB-Edge node to the PDN.

12. A communication system, comprising:

a Mobile Broadband Edge (MBB-Edge) node, configured to send a traffic offloading or a non traffic offloading indication to a NodeB according to a traffic offloading policy; and the NodeB, configured to direct the User Plane (UP) data of a Packet Switched (PS) service to a Public Data Network (PDN) through a fixed broadband bearer network of an offloading path that bypasses UP data communication of the PS service through the MBB-Edge node, according to a traffic offloading indication, and to direct the UP data of the PS service to the MBB-Edge node to receive, by the MBB-Edge node, the UP data of the PS service from the NodeB and to direct the UP data of the PS service to the PDN, according to a non traffic offloading indication.

13. The communication system of claim 12, wherein the MBB-Edge node comprises:

a Radio Network Controller (RNC) function module, configured to send the traffic offloading indication to the NodeB according to the traffic offloading policy, wherein the traffic offloading indication instructs the NodeB to direct UP data of a PS service to the PDN through the fixed broadband bearer network of the offloading path.

14. The communication system of claim 13, wherein the MBB-Edge node further comprises:

a Gateway GPRS Support Node (GGSN) function module, wherein GPRS stands for General Packet Radio Service, wherein:

the RNC function module is further configured to, when the non traffic offloading indication instructs the NodeB to send the UP data of the PS service to the MBB-Edge node, receive the UP data of the PS service sent by the NodeB and send the UP data of the PS service to the GGSN function module; and the GGSN function module is configured to direct the UP data of the PS service received by the RNC function module to the PDN.

15. The communication system of claim 12, wherein the NodeB comprises a NodeB function module, a Radio Network Controller (RNC) Packet Switched User Plane (PS UP) function module and a Gateway GPRS Support Node (GGSN) User Plane (UP) function module, wherein GPRS stands for General Packet Radio Service, wherein:

the NodeB function module is configured to receive UP data of a PS service requested by a Mobile Station (MS) and send the UP data to the RNC PS UP function module;

the RNC PS UP function module is configured to receive an indication for offloading the UP data and send the UP data received by the NodeB function module to the GGSN UP function module; and the GGSN UP function module is configured to direct the UP data received by the RNC PS UP function module to the PDN through the fixed broadband bearer network of an offloading path according to the traffic offloading indication.

* * * * *